United States Patent [19]

Kanayama et al.

[11] 4,348,701
[45] Sep. 7, 1982

[54] MODE SWITCHING CIRCUIT

[75] Inventors: Katsumi Kanayama; Kenzi Furuta; Kazuyasu Motoyama, all of Hachioji, Japan

[73] Assignee: Olympus Optical Co., Ltd., Tokyo, Japan

[21] Appl. No.: 151,469

[22] Filed: May 19, 1980

[30] Foreign Application Priority Data

May 28, 1979 [JP] Japan .................................. 54-65837

[51] Int. Cl.³ ............................................. G11B 15/12
[52] U.S. Cl. ...................................... 360/61; 360/62; 360/137
[58] Field of Search .......................... 360/61, 62, 137; 307/115

[56] References Cited

U.S. PATENT DOCUMENTS 3,911,484 10/1975 Motou .................................. 360/61
3,930,266 12/1975 Okamoto .............................. 360/62
4,015,090 3/1977 Kitada ................................... 360/61
4,203,139 5/1980 Horiuchi ............................... 360/61

FOREIGN PATENT DOCUMENTS 7125967 7/1971 Fed. Rep. of Germany.
2318641 3/1976 Fed. Rep. of Germany.
52-123613 of 1977 Japan.

Primary Examiner—Vincent P. Canney
Attorney, Agent, or Firm—Frishauf, Holtz, Goodman and Woodward

[57] ABSTRACT

A mode switching circuit has external terminals, a mode selection means for selecting a mode in accordance with the kind of a signal applied to the terminals, and a means for designating a mode selection state in the mode selection means by a mode selection signal. The external terminals are used commonly for a plural kinds of signals.

9 Claims, 7 Drawing Figures

F I G. 1
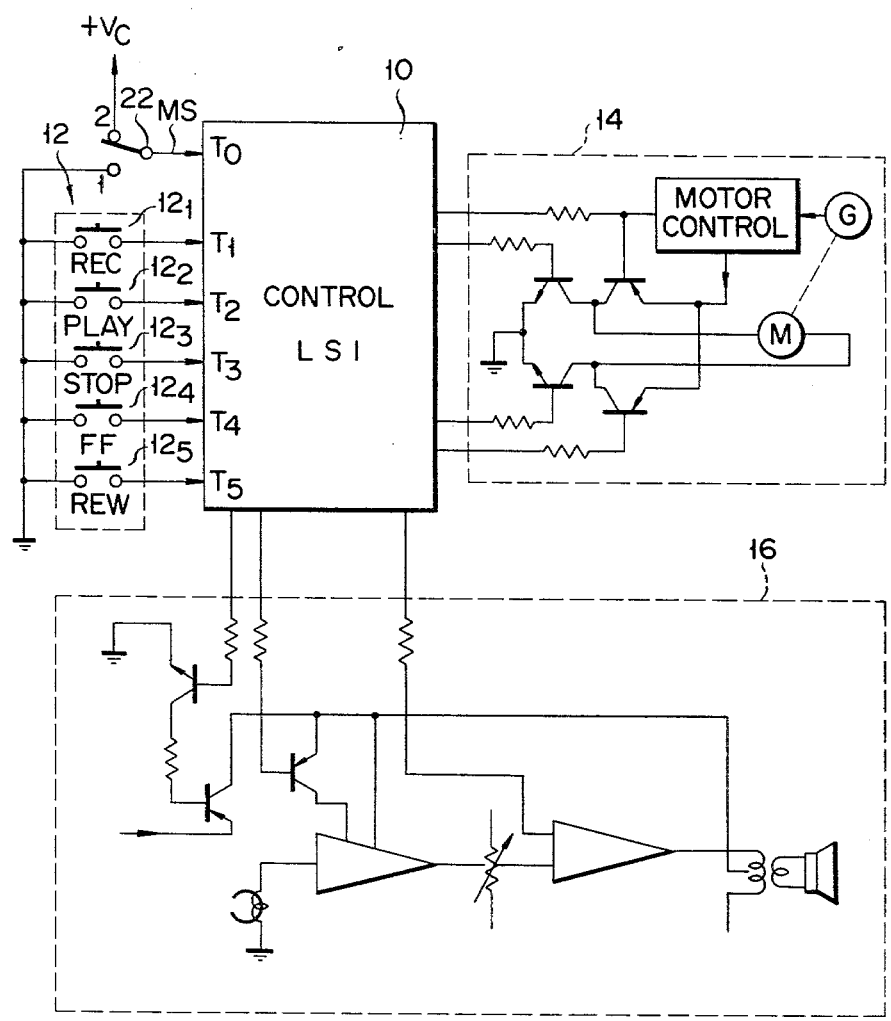

MODE SWITCHING CIRCUIT

BACKGROUND OF THE INVENTION

The present invention relates to a mode switching device by which a limited number of terminals such as external terminals of an integrated circuit (IC) device may be used commonly for different signal processings.

In Japan there is a great demand for tape recorders of the touch button type in which operation buttons are used for different operation modes, respectively. In foreign countries, particularly in the U.S.A. and European countries, the major demand is for tape recorders of the slide button type in which a single button can select a plurality of operation modes. A recent increasing demand is for microcassette tape recorders of the logic control type. The logic circuit for the logic control is generally integrated into a large scale integrated circuit (LSI) of one chip for the reason that the space to accommodate it is restrictive and the manufacturing cost reduction for mass production must be realized. The signals applied to the control LSI of the touch button type tape recorder are different from those used in the slide button type tape recorder. In the touch button type tape recorder, the respective operation buttons are in the ON state only when depressed while they are in the OFF state normally. As a conventional measure for this, latch circuits are provided for the respective operation buttons, for the purpose of temporarily storing the depression of the operation button. In the case of the slide button type device, a switch corresponding to the position of the operation button is continuously depressed, with no need for the storing function by the latch circuit.

As described above, the input signal states, or the input modes, of the LSI are different in accordance with the input signals used. Therefore, when a circuit adaptable for the two kinds of the input modes is designed by using a single LSI, the number of the external terminals of the LSI is extremely increased. The cost of the LSI depends largely on the number of the external terminals. Further, when the number of the external terminals is increased, the size of the LSI is increased. This makes it difficult to reduce the size of the tape recorder. For this reason it is undesirable that the number of the terminals is increased with the increase of the kinds of the input modes.

SUMMARY OF THE INVENTION

Accordingly, an object of the present invention is to provide a mode switching circuit in which a minimal number of external terminals of an LSI circuit may be used for a plurality of operation modes.

Another object of the present invention is to provide a mode switching circuit in which the restricted number of the external terminals of the LSI circuit may be used commonly for touch button tape and slide button type operating sections.

To achieve the above objects, the mode switching circuit is provided with a mode selection circuit for selecting one of the operation modes in accordance with a logic level of a mode selection switch. With the provision of the mode selection circuit, the versatility of the LSI may be extended with little increase of the number of external terminals of the LSI.

BRIEF DESCRIPTION OF THE DRAWINGS

FIG. 1 is a circuit diagram of a tape recorder to which a mode switching circuit of the present invention is applied;

DETAILED DESCRIPTION OF THE PREFERRED EMBODIMENTS

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art.

FIG. 1 is a circuit diagram of an electrical circuit system of a tape recorder to which the mode switching circuit according to the invention is applied. A conventional control LSI, unequipped with a mode switching circuit, has a function to control a motor control system 14 and a recording/playback (REC/PB) amplifier 16 in accordance with operation mode data supplied from a touch type operating button section 12 of the tape recorder. The control by such an LSI is not the subject matter of the present invention. Accordingly, a detailed description of the prior art LSI will be omitted. A control LSI usable as the LSI has been developed and currently used by the applicant of the present patent application. Additionally, a model SM-4 manufactured by Sharp Co., Japan or a model 8048 manufactured by Intel Co., U.S.A. may also be used for the LSI. For further details of them, reference shall be made to the application notes published by the corresponding makers. The motor control system 14 may be constructed by a speed regulator IC, a model TCA 955 manufactured by Siemens Co., West Germany, for example. The way of use of the IC is described in detail in the application note by the same company. The operation button section 12 includes five push switches $12_1$ to $12_5$ for designating five operation modes; a record (REC) switch $12_1$, a playback (PLAY) switch $12_2$, a stop (STOP) switch $12_3$, a fast feed (FF) switch $12_4$ and a rewind (REW) switch $12_5$. Those switches are in the ON state only when the corresponding buttons are depressed; they are in the OFF state normally.

Figure 2:
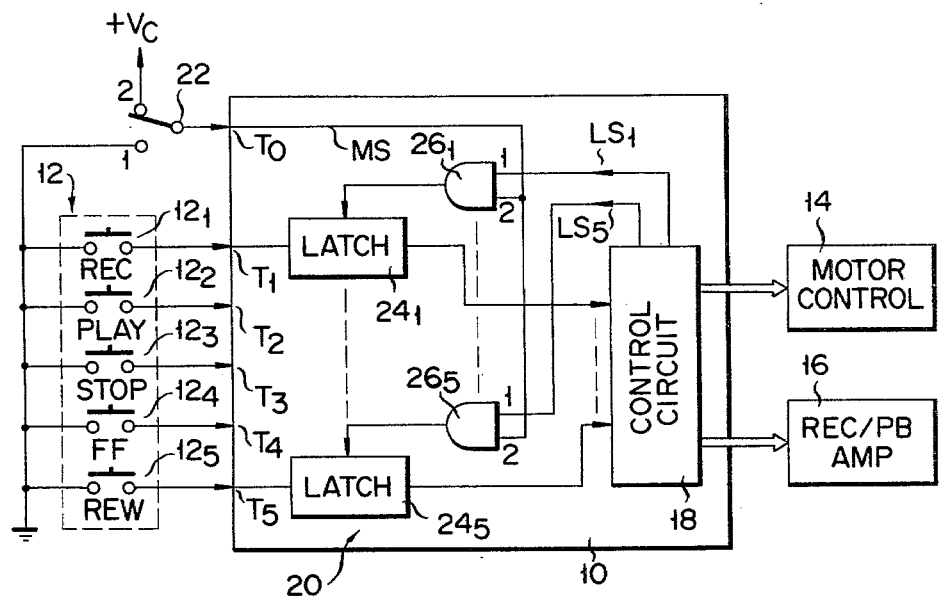
FIG. 2 is a circuit diagram of an LSI 10 used in the circuit shown in FIG. 1.

Referring to FIGS. 1 and 2, switches $12_1$ to $12_5$ are respectively connected to the external terminals T1 to T5 of a control LSI 10 of the present invention. As seen in FIG. 2, respectively terminals T1 to T5 are coupled with a control circuit 18 in the LSI 10 which will be described later. For assigning the control circuit 18 to the signals applied to the terminals T1 to T5, a mode selection circuit 20 (the constituents of which are described later) is provided between the terminals T1 to T5 and the control circuit 18. A mode selecting state in the mode selection circuit 20 is determined depending on a logic level of a mode selection signal MS applied from an external terminal T0. The logic level of the signal MS is changed by changing a mode selection switch 22 which is coupled to terminal T0. For example, when a contactor of the switch 22 is connected via a first contact to ground, the signal MS becomes logical "0". When the contactor of the switch 22 is connected to a power source +Vc through a second contact, the signal MS becomes logical "1".

Figure 3:
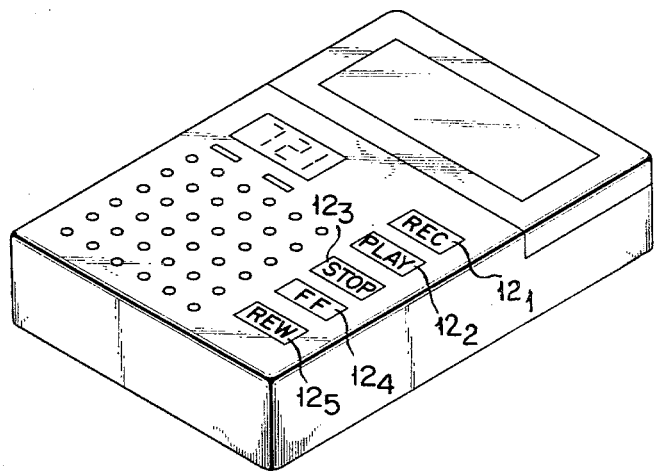
FIG. 3 is a perspective view of an appearance of a touch button type tape recorder to which the construction shown in FIG. 2 is applied.

FIG. 2 shows an internal circuit construction of the LSI 10 shown in FIG. 1. The circuit construction shown in FIG. 2 is applied to a tape recorder of the touch button type as shown in FIG. 3. In FIG. 2, signals applied to the LSI 10 through the terminals T1 to T5 are applied to the control circuit 18, through latch circuits $24_1$ to $25_5$. Load signals LS1 to LS5 for the latch circuits $24_1$ to $25_5$ are applied from the control circuit 18 to the latch circuits $24_1$ to $25_5$, through the first input terminals of AND gates $26_1$ to $26_5$. The latch circuits $24_1$ to $24_5$, and the AND gates $26_1$ to $26_5$ cooperate to form the mode selection circuit 20. The AND gates $26_1$ to $26_5$ receive at the second input terminals the mode selection signal MS. As shown, when the switch 22 is turned to the power source +Vc, the logic level of the signal MS is "1". At this time, since the AND gates $26_1$ to $26_5$ are all enabled, the control circuit 18 permits the latch circuits $24_1$ to $25_5$ to perform the temporary storage. For example, when the switch $12_5$ is once turned on, a rewind command is temporarily stored in the latch circuit $24_5$. In accordance with the contents of the latch circuit $24_5$, the control circuit 18 gives a command to rewind to the motor control system 14, thereby to mute the REC/PB amplifier 16.

Figure 4:
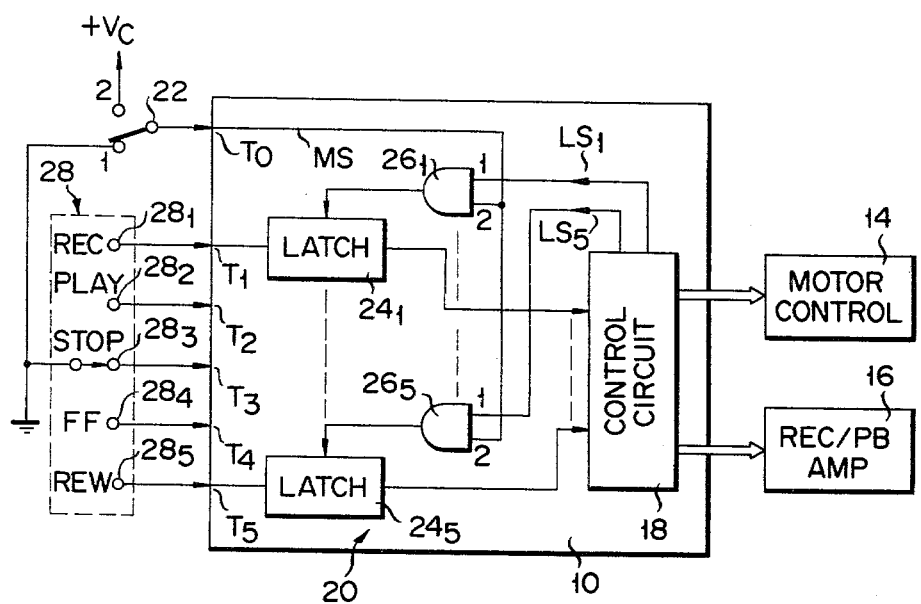
FIG. 4 is a block diagram of the circuit used when the push type operating button 12 shown in FIG. 2 is replaced by a slide type operating button 28.
Figure 5:
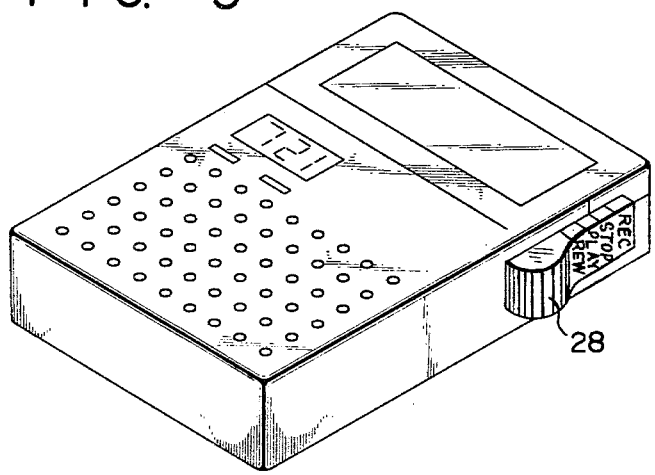
FIG. 5 is a perspective view of an appearance of the slide type tape recorder to which the construction shown in FIG. 4 is applied.

FIG. 4 illustrates an example of the mode switching circuit employing a slide type operation button section 28 in place of the touch type operation button section 12. The circuit construction shown in FIG. 4 is applied for a tape recorder of the slide button type as shown in FIG. 5. In FIG. 4, the push switches $12_1$ to $12_5$ are replaced by contacts $28_1$ to $28_5$ of the operation button 28. As shown in FIG. 5, when the fast feed (FF) mode is not employed all the designer has to do is not to use the terminal T4 of the LSI 10. In the switch of the slide button type, a contact selection state corresponding to each mode is maintained. For example, in the rewind (REW) mode, the contact $28_5$ is left grounded. Accordingly, there is no need for storing the data representing that the contact $28_5$ is selected in the latch circuit $24_5$. In this case, the switch 22 is switched to the first contact side to set the logical level of the mode selection signal MS to "0". As a result, the AND gates $26_1$ to $26_5$ are all disabled, so that no load signals LS1 to LS5 are applied to the latch circuits $24_1$ to $24_5$. Thus, the latch circuits $24_1$ to $24_5$ are left in a signal passing state.

As seen from FIGS. 2 and 4, the LSI 10 is compatible with either the push type operation button section 12 or the slide type operation button section 28 by changing the logical level of the mode selection signal MS applied to the terminal T0 of the LSI 10. In other words, by additionally using one terminal T0, the five terminals T1 to T5 have the functions of 10 terminals. When the touch button type tape recorder as shown in FIG. 3 is manufactured for the domestic (i.e., Japanese) market with a touch type switch section 12, all one has to do is to connect the terminal T0 to the power source +Vc at the manufacturing stage. For manufacturing the slide button type tape recorder as shown in FIG. 5 for the foreign market, all one has to do is to connect the terminal T0 to ground. When the kinds of the signals applied to the terminals T1 to T5 are known at the manufacturing stage, there is no need for specially providing the switch 22.

Figure 6:
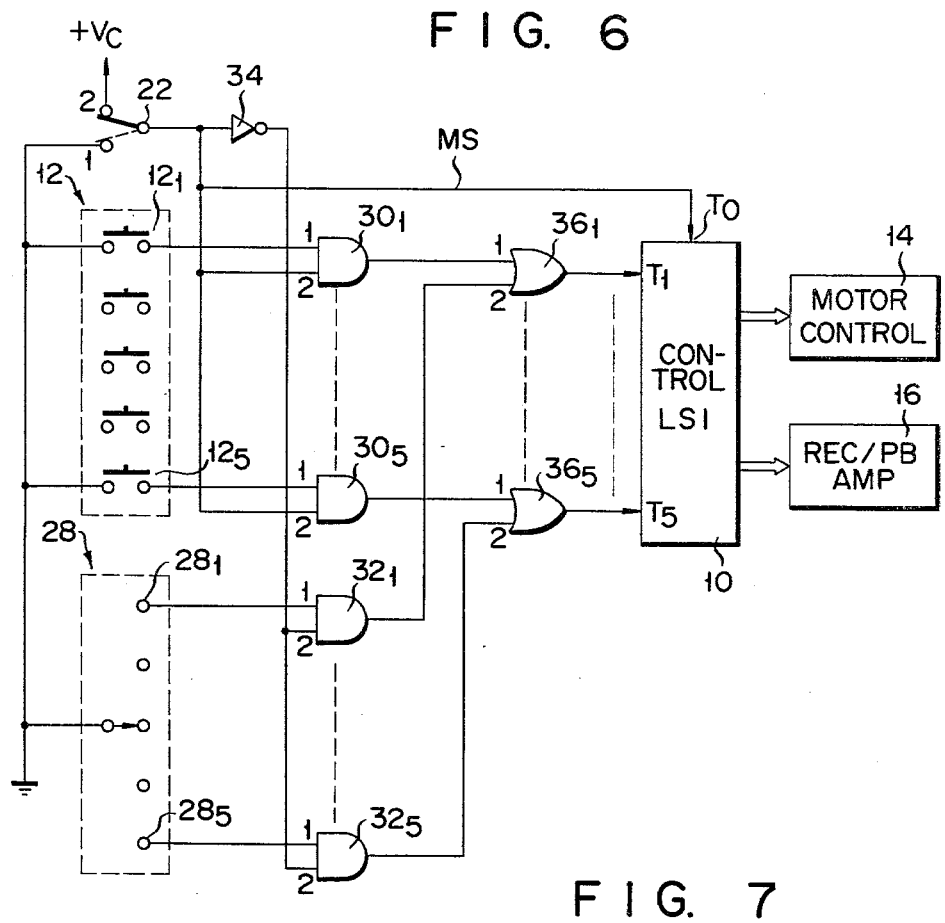
FIG. 6 is a circuit diagram of the circuit which is the combination of the circuit constructions shown in FIGS. 2 and 4.
Figure 7:
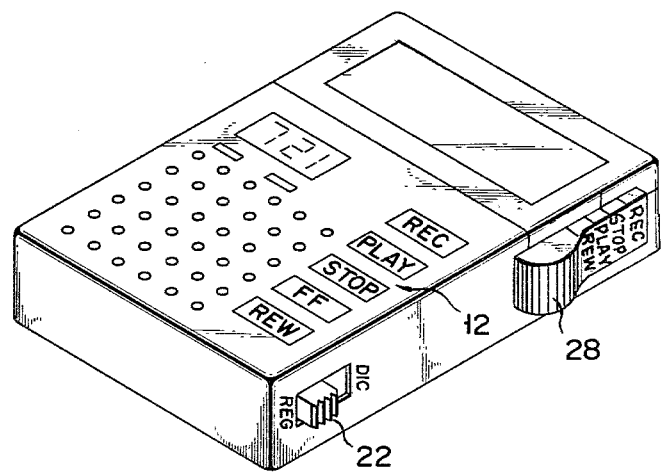
FIG. 7 is a perspective view of an appearance of the slide/touch type tape recorder to which the construction shown in FIG. 6 is applied.

FIG. 6 shows a circuit construction corresponding to the combination of the circuits shown in FIGS. 2 and 4. The circuit construction as shown in FIG. 6 is applied for the touch/slide type tape recorder as shown in FIG. 7. In FIG. 6, the switches $12_1$ to $12_5$ within the operation button section 12 are connected to the first input terminals of AND gates $30_1$ to $30_5$, respectively. The contacts $28_1$ to $28_5$ of the operation button section 28 are respectively connected to the first input terminals of the AND gates $32_1$ to $32_5$. The second input terminals of the AND gates $30_1$ to $30_5$ are all connected to the contactor of the mode selection switch 22. The contactor of the switch 22 is connected to the second input terminals of the AND gates $32_1$ to $32_5$, through the inverter 34. The output terminals of the AND gates $30_1$ to $30_5$ are respectively connected through the first input terminals of OR gates $36_1$ to $36_5$ to the terminals T1 to T5 of the LSI 10. Applied to the terminal T0 of the LSI 10 is the mode selection signal MS derived from the switch 22. The second input terminals of the OR gates $36_1$ to $36_5$ are respectively connected to the output terminals of the AND gates $32_1$ to $32_5$, respectively.

The mode selection switch 22 is provided on the side wall of the tape recorder as shown in FIG. 7. As shown, when the switch 22 is set to the REG side, the switch 22 selects the second contact side at logical "1". At this time, the signal MS is logical "1", so that the internal state of the LSI 10 is that shown in FIG. 2. The logical "1" of the signal MS also enables the AND gates $30_1$ to $30_5$. At this time, the output logic of the inverter 34 has "0", so that the AND gates $32_1$ to $32_5$ are disabled. Thus, the switches $12_1$ to $12_5$ are coupled with the LSI 10, through the AND gates $30_1$ to $30_5$ and the OR gates $36_1$ to $36_5$, respectively. In this case, the tape recorder shown in FIG. 7 is used as the touch button type tape recorder.

When the switch 22 is turned to the DIC side, the contactor of the switch 22 is grounded through the first contact as shown in FIG. 6. In this case, the logical level of the signal MS becomes "0" and the internal state of the LSI 10 becomes that as shown in FIG. 4. As a result, the AND gates $30_1$ to $30_5$ are closed and the AND gates $32_1$ to $32_5$ are enabled. The contacts $28_1$ to $28_5$ of the slide type operation button section 28 are coupled with the LSI 10, through the AND gates $32_1$ to $32_5$, and the OR gates $36_1$ to $36_5$. In this case, the tape recorder shown in FIG. 7 is used as the slide button type tape recorder.

Although specific constructions have been illustrated and described herein, it is not intended that the invention be limited to the elements and constructions disclosed. One skilled in the art will recognize that other particular elements or sub-constructions may be used without departing from the scope and spirit of the invention.

For example, when two external terminals T0 are provided and two individual binary mode selection signals are used, each of the terminals T1 to T5 can select four kinds of signals at maximum. In this case the control LSI 10 may be used for controls other than the tape recorder control.

What we claim is:

1. In a mode switching circuit for a multi-mode electronically controlled tape recorder, the mode switching circuit including an operation switch section for issuing operating instruction signals to set the mode of operation of the tape recorder; and a control device including a control circuit for controlling the operation mode of the tape recorder according to the operating instruction signals from the operation switch section, said control device having terminals through which said operation switch section is coupled to said control circuit of said control device, the improvement wherein said mode switching circuit further comprises: mode switch means coupled to said control device and generating a mode selection signal having a given logic level; and mode selection means coupled to said mode switch means, to said operation switch section and to said control circuit for setting the transmission state of said operating instruction signals from said operation switch section to one of at least two selectable transmission states, and for coupling said operating instruction signals to said control circuit according to the set transmission state as a function of the logical level of said mode selection signal.

2. The mode switching circuit of claim 1, wherein said mode selection means includes latch means and gating means coupled to said latch means, one of said transmission states comprising coupling said operating instruction signals to said control circuit via said latch means in a latching state, and another of said transmission states comprises coupling said operating instruction signals to said control circuit via said latch means in a non-latching state.

3. The mode switching circuit of claims 1 or 2, wherein said mode selection means comprises a part of said control device.

4. The mode switching circuit of claims 1 or 2, wherein said control device and said mode selection means are included in a common integrated circuit, and said terminals are terminals of said common integrated circuit.

5. The mode switching circuit of claims 1 or 2, wherein said mode selection signal is a logical signal applied from said switch means through at least one of said terminals of said control device.

6. The mode switching circuit of claim 1, wherein:
said operation switch section comprises at least one of a touch type switch means in which, when operated, the ON state is not maintained, and a hold type switch means in which, when operated, the ON state is continued;
said mode selection means includes a latch circuit for selectively temporarily storing said operating instruction signals issued by said operation switch section; and
said mode selection means including means for causing said latch circuit to perform a storage operation on said operating instruction signals when said mode selection signal has one given logical state, and for causing the storage operation of said latch circuit to be inhibited responsive to another given logical state of said mode selection signal.

7. The mode switching circuit of claim 6, wherein:
said touch type switch means comprises a touch type switch operation section of a tape recorder, and said hold type switch means comprises a slide type switch operation section of the tape recorder; and
said mode switch means includes a mode switch for changing the logical level of said mode selection signal to designate which of said touch type switch operation section and said slide type switch operation section is coupled to said control circuit to control the operation mode of said tape recorder.

8. The mode switching circuit of claim 7, wherein said operation switch section comprises both said touch type switch operation section and said hold type operation section, and said mode switch means further comprising logical gating means coupled to said mode switch and selectively coupling instruction signals from one of said touch type switch operation section and hold type switch operation section to said control circuit as a function of the logical level of said mode selection signal generated by said mode switch.

9. The mode switching circuit of any one of claims 6, 7 or 8, wherein said mode selection means includes latch means and gating means coupled to said latch means, one of said transmission states comprising coupled said operating instruction signal to said control circuit via said latch means in a latching state, and another of said transmission states comprises coupling said operating instruction signals to said control circuit via said latch means in a non-latching state.

* * * * *